No. 872,341. PATENTED DEC. 3, 1907.
G. F. GREENE.
MEANS FOR HARVESTING COTTON.
APPLICATION FILED MAR. 12, 1906.

Witnesses
J. M. Imrie
J. E. Griggs

Inventor
Gilbert F. Greene
By Benj. R. Catlin
Attorney

No. 872,341. PATENTED DEC. 3, 1907.
G. F. GREENE.
MEANS FOR HARVESTING COTTON.
APPLICATION FILED MAR. 12, 1906.
5 SHEETS—SHEET 3.

Witnesses
J. C. Griggs

Inventor
Gilbert F. Greene
By Benj. R. Catlin
Attorney

UNITED STATES PATENT OFFICE.

GILBERT F. GREENE, OF WASHINGTON, DISTRICT OF COLUMBIA.

MEANS FOR HARVESTING COTTON.

No. 872,341.  Specification of Letters Patent.  Patented Dec. 3, 1907.

Application filed March 12, 1906. Serial No. 306,431.

*To all whom it may concern:*

Be it known that I, GILBERT F. GREENE, a resident of Washington, in the District of Columbia, have invented certain new and useful Improvements in Means for Harvesting Cotton; and I do hereby declare the following to be a full, clear, and exact description of the invention, such as will enable others skilled in the art to which it pertains to make and use the same.

This invention relates to means for harvesting cotton, and has for its objects to provide a picker supported mechanically apart from the person of the operator, and provided with a motor-driven brush, said picker being freely movable in all directions; and to provide a picker adapted to be manipulated with one hand; and further to combine with a picker of such general character a vehicle, and means for collecting and loading cotton; to provide such a picker with connections whereby a large area can be picked and loaded without moving the vehicle, and to secure other advantages obviously suggested by the specifications herein.

The invention consists in the construction hereinafter described and pointed out.

In the accompanying drawings which illustrate the invention,
—Figure 1 is an elevation showing the improvement in connection with a two-wheeled vehicle;
Fig. 6 is an elevation of the engine and connections;
Fig. 7 is a perspective of a carriage for picker-spindle-driving pulleys and adjacent parts;
Fig. 8 is a similar view of a substitute for the pulleys shown in Fig. 7;
Fig. 9 is a section of a valve;
Fig. 10 is a broken perspective of a picker brush;
Fig. 11 is an end view of a modification of the picker-spindle;
Fig. 12$^\times$ is a broken section of a valve casing.

The invention is adapted for use with a vehicle supporting a picker-and-blower-actuating motor and provided with a suitable body for loading with cotton. For this purpose a two wheeled cart is suitable though not essential. In the cart illustrated herein, a cart body is supported on wheels by means of brackets 1 fixed to its bottom or sides, each bracket being furnished with a short wheel axle 2.

3 denotes a frame fixed to the cart body, and 4 a motor or engine, 5 a driving pulley, and 6 a fan or other air forcing device. 7 indicates an engine shaft on which is fixed the said pulley.

8 denotes a fan or blower shaft journaled as shown and driven by means of a pulley 9 and belt 10 connecting it to a pulley 10$^\times$ on the engine shaft. The blower has an extension communicating with tube 12 by means of conduits 11. Said tubes are each stepped in a tubular post or socket 13. Each tube 12 may turn in its socket, and 14 is a set screw whereby the parts may be fixed in case it is desired. Upon tubes 12 are loosely supported gear wheels 15 meshing each with a wheel 16 on a shaft 17 which has at its foot a pulley 18 driven by pulley 5 through medium of a pulley 19 and belt 5$^\times$. The pulleys 19 are adjustably supported by blocks 19$^\times$ fixed by set screws as shown.

20 is a pulley fixed to the gear 15, and 21 is a belt driven by the pulley.

The construction and connections to be described are such that the engine drives the blower to produce an air blast in the picker and also drive a flexible picker-operating shaft or spindle. Air is driven through conduit 11 and tube 12 into a communicating tube 22 provided with outlet valves 23. Either of these valves can be automatically opened to admit air blast into a flexible tube 24 leading to the picker. The use of exhaust steam either in connection with a blower or as a substitute therefor is provided for by a pipe 21$^a$ by which the exhaust port of the engine can be made to communicate with the tube 22.

Figure 2:
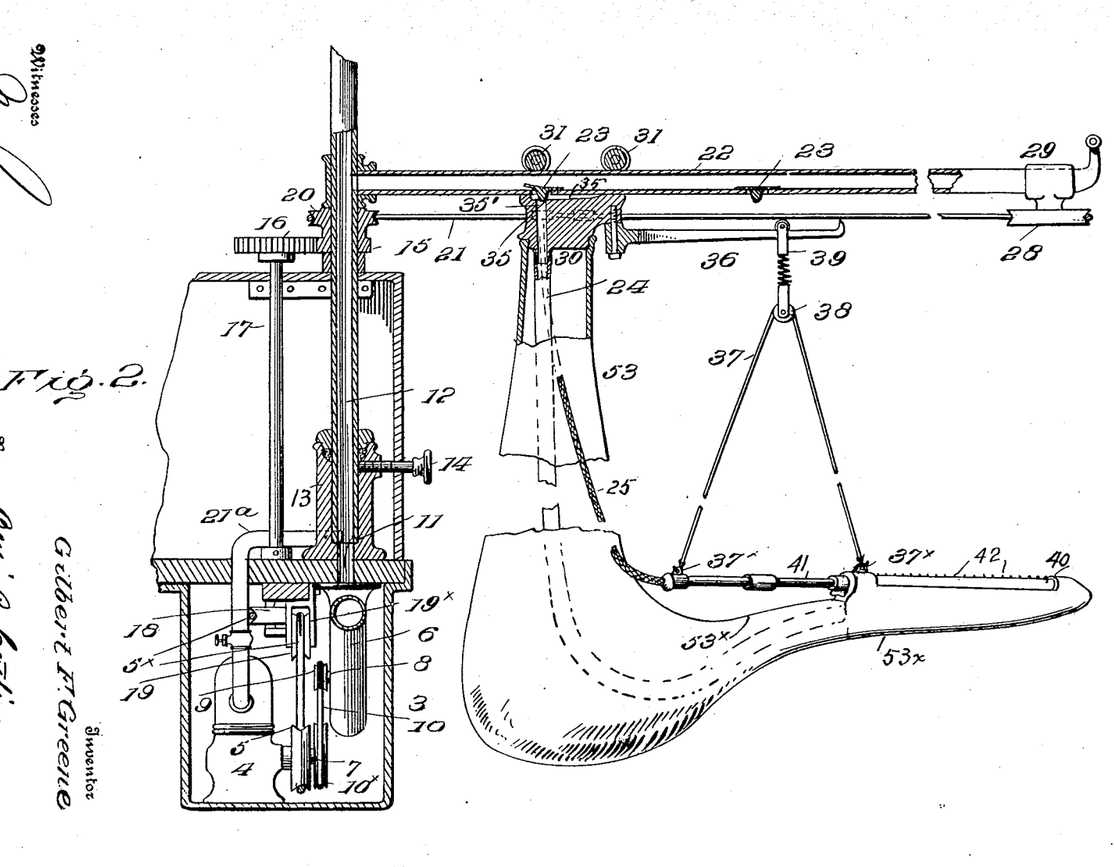
Fig. 2 is a broken elevation partly in section and on a larger scale.
Figures 6, 7, 8, 9, 10, 11, 12X:
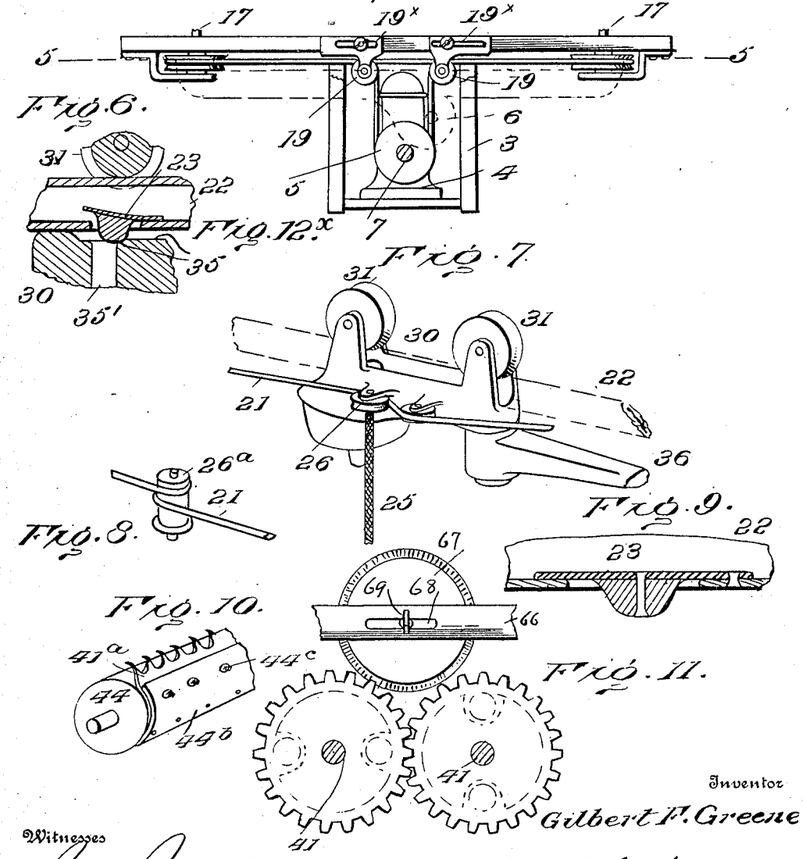

25 denotes a flexible picker-driving shaft fixed to the axle of either one of a pair of wheels 26 driven by a belt 21 which is driven by a pulley 20 on tube 12. The outer end of belt 21 passes around a pulley 28 pivoted in a sleeve 29 made adjustable by sliding on tube 22 and adapted to be fixed thereon by means of a set screw. This tube is fixed to the oscillating tube 12 and can be swung horizontally when desired. The upper ends of tube 24 and shaft 25 are supported by a carriage 30 adapted to be moved to and fro at will along the air tube 22 upon which it is supported by pulleys 31 mounted in a frame having suitable uprights connected by a bar as shown in Fig. 7. This carriage has an air chamber adjacent the tube and its bottom is adapted to push inwardly to open the valve, as indicated at 35, see Figs. 2 and 12×. 35′ is an opening through the bottom of the carriage whereby the valved exit communicates, when the valve is thus opened, with the flexible air tube 24. The carriage 30 also supports a pivoted arm 36 from which depends the picker by means of a cord 37 running over a pulley 38 connected by a spring with the block of a pulley 39 movable along said arm.

It will be obvious that while the picker may be normally suspended in a horizontal plane either end can be easily tilted up or down by suitably moving the cord over the suspending pulley 38. See broken lines in Fig. 3. This enables the picker to be freely pointed and thrust in any direction. The cord 37 is preferably supplied with hooks whereby its ends can be connected at will with rings 37× or the like on the frame, in which spindle 41 turns. If desired in any case both hooks can be engaged with one of the rings, for example, that nearest the longitudinal center of the picker, and the invention is not limited to the use of two rings or separate points of attachment. It will be obvious that a picker suspended from a pulley by a flexible connection, said pulley being supported by a spring allowing movement in a horizontal plane, and the whole supported from the crane, provides for easily covering every part of every bush within a large range. The picker comprising a part or frame 40 and a spindle 41 journaled in said frame and a bar 44 carrying the picking teeth or brush proper 42, is adjustably suspended normally in an approximately horizontal plane by the cord 37 connected to the picker frame at two points sufficiently remote from each other and substantially as indicated. The flexible shaft is fixed to spindle 41 and rotates it in its bearings in the picker frame.

45 denotes a brush-stripping cylinder fixed to and rotating with the spindle within the frame.

44 denotes bars for carrying teeth, pins or the like for gathering cotton. This device will hereinafter be styled a brush. Two brushes coöperating with a single cylinder are shown in the principal figures but the invention is not limited in respect of the number of brushes, nor limited to a single cylinder, nor to a cylindrical form of the cotton stripper or strippers.

Figure 13:
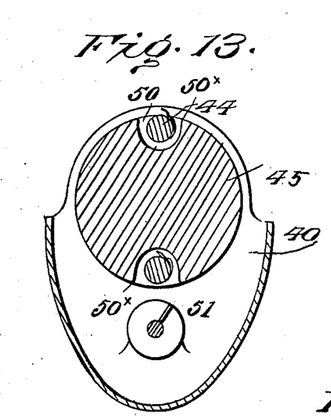
Fig. 13 is a transverse section on line 13, 13 of Fig. 12.
Figure 14:
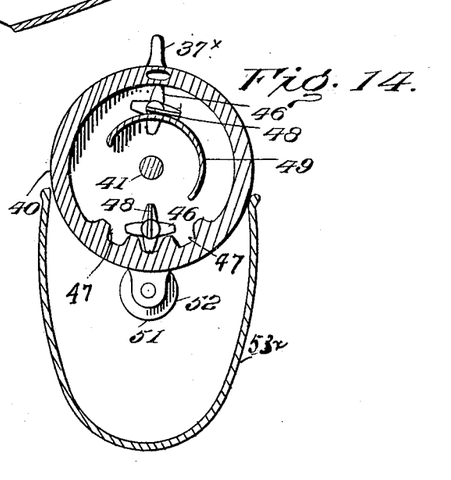
Fig. 14 is a like section on line 14, 14 of Fig. 12.

The bars or rods 44 are situated in slots 50 formed in the cylinder and are so related to the rear lip or side 50× of the slot (see Fig. 13) that the cotton will be pushed from the brush as to be described. The pivoted brush bars 44 can each be provided with a seat or socket adapted to hold a toothed plate 41ª preferably by friction. See Fig. 10. Such a seat may be formed by securing a holder 44ᵇ of sheet metal or equivalent near and conforming to the shape of the bar and fixed thereto as indicated in Fig. 10. The plate 41ª of similar form when inserted between the holder and bar will be held by friction, said holder being preferably made of spring metal. 44ᶜ denotes corresponding indentations in the holder and plate which may be used to increase friction between the parts. The flexible picker-actuating shaft can be connected to the axis of either pulley wheel 26, or a single roller 26ª (see Fig. 8) can be employed.

In Fig. 11 is shown a modification employing two picker spindles 41 having cylinders to be driven by the flexible shaft operatively connected to either spindle and rotating them so as to move the upper surfaces toward each other to pick and pass cotton down between them. 66 denotes a fixed part of the picker or spindle frame, and 67 a cylinder pivotally supported in elongated bearings such as indicated at 68. A handle or thumb piece for shifting this roller is denoted by 69. The lower cylinders when one is driven are caused to move simultaneously and oppositely. The cylinder 67 is driven by friction by either lower cylinder when put in operative contact therewith. The office of cylinder 67 is to direct or hold cotton bolls in contact with the brushes either on one side of the pair of brush-supporting cylinders or on the other as determined by shifting said cylinder 67 in its support. The upper cylinder 67 may be provided with pivoted brushes to coöperate with similar ones on the lower cylinders, but if the brushes are omitted from the upper cylinder it will operate to draw more cotton toward the brushes in the lower cylinders. The brushes are journaled in disks or flanges forming a part of or secured to the ends of the cylinder 45, thereby being mediately fixed to the spindle. On the inner end of each brush bar or support are fixed teeth 46. Fixed to the frame in the path of these teeth is a rack 47 which has the effect when the cylinder 45 with the brushes are rotated to turn them backwardly on their own axes and thus by the coöperation of the cylinder or equivalent remove from the teeth the cotton just gathered by the brush. One of the teeth 46 of each brush axis has an extension 48 adapted to engage a rib or cam 49 fixed to the picker frame with the effect to hold the brush to its work of picking cotton during half or approximately half the period of the rotation of the cylinder and brushes. The construction is such that the brushes can pick cotton on either side if suitably held against a cotton bush and it is therefore adapted for right and left hand work. The picked cotton is pushed off the brush by the lip 50$^x$ of the cylinder at the time when the brush is turned backwardly by the rack 47 with the effect to withdraw the teeth from the cotton. It will be understood that each brush is carried always in one direction and successively caused to turn on its own axis in an opposite direction to that of the cylinder. The cotton thus discharged from the brush falls into the mouth of a sack extension or tube and in contact with a conveying screw 51 suitably pivoted in the picker frame and rotated by the cylinder disk by means of gears or friction disks 52. The particular form of the conveyer for the cotton situated in or below the picker may be varied.

Figure 12:
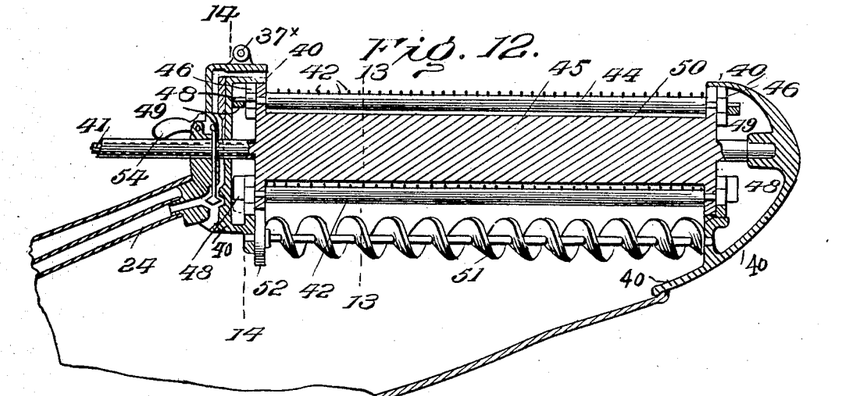
Fig. 12 is a longitudinal section of a picker, and showing an air or steam blast-controlling valve, and a tube surrounding the rotary picker axis to be grasped by an operator.
Figure 15:
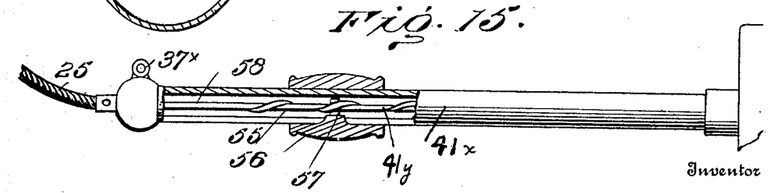
Fig. 15 is a partial section of a modified picker handle provided with a supplementary picker-spindle-operating handle.

53 is a receptacle or sack for cotton fixed to the carriage 30 and containing the flexible air tube. 53$^x$ is a flexible tube or sack extension fixed to the picker. Said tube is provided within the picker frame with a two-way valve controlled by stem or handle 54. Normally, air forced through the tube is directed to the space above the brush to blow away trash. Said stem or handle however is conveniently located for fingering the valve to close the normally open valve port or way and bring into action a port or way communicating with the sack by which a stoppage in the mouth of the sack may be overcome. The handle has a fulcrum in the frame 40, and is pivotally connected with the valve, as indicated in Fig. 12, the valve being there shown in an intermediate position. If desired a picker spindle 41$^y$, Fig. 15 fixed to a brush carrying cylinder 45 may be provided with a worm or screw 55, and with a handle 56 adapted to slide on tube 41$^x$ surrounding said spindle and engage the screw thread by means of a lug or anti-friction roller 57 extending through a slot in said tube 41$^x$ fixed to the frame 40. At 58 the thread is omitted for a sufficient distance to permit the sliding handle to be placed at rest. The function of the handle is to operate the picker spindle and brush or brushes in case of an accident to the power mechanism. The modification of the spindle illustrated in Fig. 15 is not essential to other parts of the invention. Said slotted tube 41$^x$ does not rotate with the driven spindle, and can be conveniently held to direct the picker when shaft 25 is rotating the picker spindle. When desired this outer tube can be used without the supplementary driving handle.

Evidently in all cases it is desirable that the operator have a non-rotating part to grasp when manipulating the rotary picker, but it is not essential that it extend the full length of the handle as shown in Fig. 15, though this is preferred. Thus with the construction shown in Fig. 2 the operator may with one hand grasp the non-rotating part to which the left hand ring 37$^x$ is connected, and the short tube shown at the middle of the handle (and shown also in Fig. 3) with the other hand, it being understood that said short tube can be slipped lengthwise on the handle to any convenient position, and when held allows the spindle to freely turn. Or with said other hand he may grasp the part of the frame near the right hand ring 37$^x$.

Figure 4:
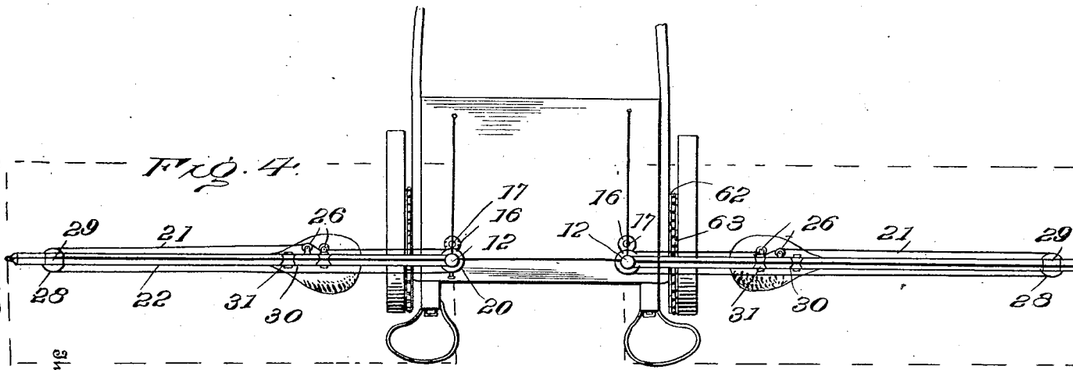
Fig. 4 is a plan.
Figure 5:
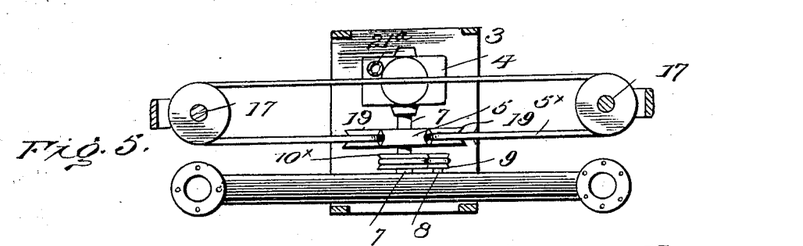
Fig. 5 is a section on line 5, 5 of Fig. 6;
35

From the foregoing it will be understood that the air tubes 12 and 22 constitute a crane whereby the picker and its connections can be swung horizontally to reach a number of rows of bushes, and also that the pivoted picker-supporting arm 36 can be swung on its pivot to carry the picker-connections and picker to either side independently of the movement of the crane. To support the outer end of tube 22 and hold the upper end of tube 12, stay wires or cords 59 can be used. And if desired an awning can be fixed to the crane substantially as indicated by broken lines in Figs. 1 and 4.

Figure 1:
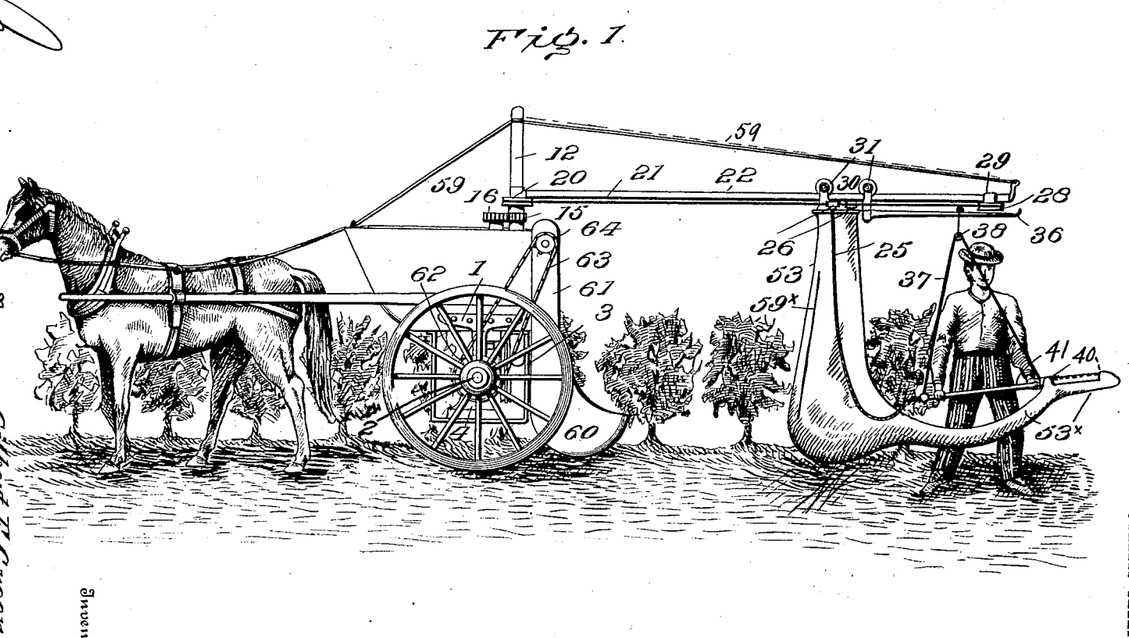
Figure 3:
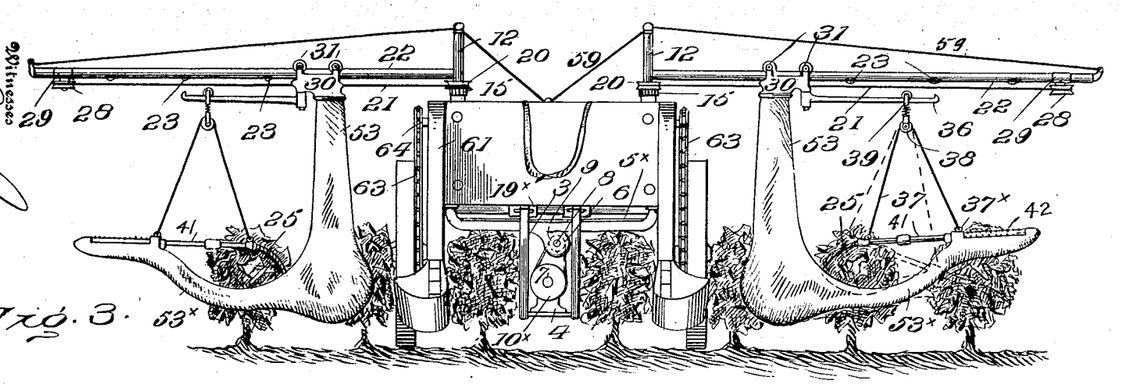
Fig. 3 is an end elevation.

In the upper part of the sack is a slit 59$^x$ (see Fig. 1) through which its contents may be emptied into a hopper 60 provided with an upwardly extending spout 61 and an endless chain or other conveyer whereby the cotton is loaded. The conveyer is conveniently driven from a pulley 62 on the wheel axle, connected by a driving chain 63 with a pulley 64 fixed on the shaft of a conveyer such as indicated in Figs. 1 and 3. Any known conveyer and any desired means for actuating the conveyer may be substituted for those shown.

The invention is not limited to the use of any particular number of picker and crane-picker-supports, nor to any particular situation of them. The purpose of the crane is to carry the picker laterally to permit the picking of an area comprising adjacent parts of a considerable plurality of rows without moving the vehicle. The picker and its connections are made adjustable along the horizontal part of the crane to more effectually cover such area. In practice when one of these areas has been picked the vehicle will be moved so as to suitably reach another. As illustrated a cart straddling two rows is to be drawn by a horse into the midst of the unpicked cotton. The operation of picking however would not be changed were the cart pushed toward unpicked bushes in manner to place the picker or pickers in operative relation thereto, the cart in such case standing among picked bushes.

The improvement is not limited to any particular means of propelling the cart or other vehicle.

Among the advantages of suspending the picker substantially as set forth is that the operator is relieved from its weight, and another is that he can when desirable use one hand to hold bolls against the picker to more thoroughly pick the cotton. Another advantage is that the picker can be thrust toward the bush rows and into any particular bush from any desired direction. Thus in some cases the operator can pick two rows and on all sides of each bush therein while passing in one direction between said rows. And this advantage is supplemented by the capacity of the brush or brushes to pick on either side of the spindle by means for suitably depositing the cotton in the receptacle.

I recommend the use of light metal tubing and wood where practicable in the manufacture of the machine to render it as light in weight as consistent with suitable strength. By suspending the engine below the vehicle body the machine has a more stable equilibrium and encroachment on the interior capacity of the vehicle body is avoided.

The receiving sack will by preference have such capacity that it will need to be emptied only when the vehicle is advanced to bring the picking devices within suitable range of a fresh area of cotton bushes determined by the character of the bushes, the capacity of the machine and other circumstances.

Having described the invention what I claim is,—

1. In a cotton picking machine, a vehicle to run between rows of bushes, a horizontally swinging picker support connected to the vehicle to carry the picker over a plurality of rows, a picker, and connections between the picker and support whereby such picker can be moved lengthwise on the same.

2. In a cotton picking machine, a vehicle to run between rows of bushes, a picker, a swinging picker support pivotally connected to the vehicle to carry the picker over a plurality of rows, and connections between the picker and support whereby it can be moved lengthwise on the same.

3. In a cotton picking machine, a vehicle to run between rows of bushes, a picker, and a swinging picker support pivotally connected to the vehicle to carry the picker over a plurality of rows, said picker having a connection with and movable on the support to and from the vehicle.

4. In a cotton picking machine, a vehicle to run between rows of bushes, a picker, a picker spindle, a handle for directing said picker, a swinging picker support, flexible connections suspending the picker from its support whereby it may be freely moved independently of said support, a picker-spindle-driving-shaft mediately carried by said support, and means to rotate the shaft.

5. In a cotton picking machine, a vehicle to run between rows of bushes, a picker, a picker support pivotally connected to the vehicle to swing transversely so as to carry the picker over a plurality of rows, an air tube carried by and swinging with said support, and means to force air through the tube to the picker.

6. In a cotton picking machine, a vehicle to run between rows of bushes, a picker, a picker spindle, a picker support pivotally connected to the vehicle and movable transversely to carry the picker over a plurality of rows, connections between the picker and support movable on the support to and from the vehicle, a picker-spindle-driving-shaft, and an air tube, both the shaft and tube being also movable with the picker without impairing their operativeness.

7. The combination of the vehicle, the engine, the blower, a picker, an air passage leading from the blower and delivering to the picker, said passage having an exit in addition to the delivery opening, the picker spindle, driving connections between the picker spindle and engine, said connections comprising an engine shaft, a pulley thereon, and connections whereby the same shaft drives the spindle and blows air to the picker and to the exit.

8. The combination of the vehicle, the engine, the pivoted crane, the picker suspended from the crane, the picker shaft, the air blower, conduits whereby air may be ejected adjacent the picker, and connections whereby the engine drives the picker shaft and actuates the blower, said connections being unimpaired by the swinging of the crane.

9. A vehicle, an engine, the picker comprising a frame having a rigid tubular extension whereby the frame may be manipulated, a spindle supported in the frame and having a shaft in the extension, a brush pivoted in said spindle parallel thereto, and a flexible driving shaft connected to the end of the spindle shaft, and devices whereby said flexible shaft may be operatively connected to the engine.

10. In combination with a vehicle, a picker brush, a brush support loosely connected to the vehicle, means for manipulating said support and brush, an air blast pipe on the support discharging air above and parallel to the picker brush to blow away leaves and trash, said brush support and air pipe being freely movable independently of the vehicle.

11. In combination with a picker brush support, a picker brush, an air blast pipe connected to said support and discharging air over the picker brush to blow away leaves and trash, a sack, and a valve to divert the air of the blast pipe into the sack.

12. The combination of a mechanical picker, a sack extending lengthwise under the picker, an air tube, and means to force air into the mouth of the sack, and away from the picker.

13. The combination of a vehicle, a picker-supporting frame, a picking brush, a sack fixed to the frame, a flexible tube contiguous the brush to force air into the sack, and a conduit in the frame whereby the tube may communicate with said sack.

14. The combination of a cotton receptacle, a hopper for said receptacle, a picker, and a sack fixed to the picker, said sack having an open slitted upward extension for discharging cotton into the receptacle hopper.

15. The combination of a picker, a sack fixed to the picker, said sack having a slitted upward extension for discharging cotton, a vehicle, a hopper, and a spout leading from the hopper to the vehicle interior.

16. The combination of a picker, a sack fixed to the picker, said sack having a slitted upward extension for discharging cotton, a vehicle, a hopper, and a conveyer to carry the cotton from the hopper into the vehicle.

17. The combination of a picker, a sack fixed to the picker, said sack having a slitted upward extension for discharging cotton, a vehicle, a hopper, a conveyer to carry cotton from the hopper into the vehicle, and connections whereby to actuate the conveyer.

18. The combination of the picker comprising a frame, brush and handle, a sack, a sack extension attached to the frame immediately under the picker, and a conveyer in said sack extension.

19. The combination of the vehicle, the picker support, the picker, flexible means for suspending the picker from its support, and a device movable on the support lengthwise thereof, the flexible means being connected to said device.

20. The combination of the vehicle, the picker support, the picker, flexible means for suspending the picker from its support, and a device movable on the support lengthwise thereof, the flexible means being connected to said device, said means including a spring.

21. The combination of the vehicle, the picker support, the picker, flexible means for suspending the picker from its support, a device movable on the support lengthwise thereof, the flexible means being connected to said device, and a pulley connected to said device and mediately supporting the flexible connecting means.

22. The combination of an engine, a picker comprising a spindle, a brush operatively connected to the spindle, connections whereby the engine may drive the spindle, and means whereby the spindle may be manually actuated when the power devices are for any reason inoperative, said means consisting of a handle having a screw threaded connection with the spindle and movable into an operative or inoperative situation at will.

23. In a picker, the combination of a frame, a rotatable cylinder provided with slots in its exterior, a brush pivoted in a slot in said cylinder and having teeth pointed in the direction of the cylinder rotation when in their outermost position to gather cotton, and means to turn the brush on its pivots in a direction opposite to that of the rotation of said cylinder, the edge of the slot being in the path of cotton on the brush teeth when moving in said direction whereby the cotton is arrested and the brush teeth withdrawn from the picked cotton.

24. In a picker, the combination of a frame, a rotatable cylinder provided with slots in its exterior, a brush pivoted in a slot in said cylinder and having teeth pointed in the direction of the cylinder rotation when in their outermost position to gather cotton, and means comprising a rack to turn the brush on its pivots in a direction opposite to that of the rotation of the cylinder, the edge of the slot being in the path of cotton on the picker teeth when moving in said direction whereby the cotton is arrested and the brush teeth withdrawn from the picked cotton.

25. In a picker, the combination of a frame, a rotatable cylinder provided with slots in its exterior, a brush pivoted in a slot in said cylinder, means to turn the brush on its pivots in a direction opposite to that of the rotation of the cylinder when the teeth of said brush are in their outermost position, the edge of the slot being in the path of cotton on the picking teeth when moving in said direction whereby the cotton is arrested and the brush teeth withdrawn from the picked cotton, and means for preventing the brush turning on its support while picking cotton.

26. The combination of the engine, the blower, the crane comprising air tubes receiving air from the blower, and a horizontal arm, valves on said arm, a picker, a flexible air tube discharging in the picker, and means for putting said flexible air tube in communication with the valved openings of said arm.

27. In a cotton picking machine, the combination of a picker, a pulley, a pulley support, and a cord or the like passing over the pulley and having its ends attached to the picker at separated points whereby the picker is supported in a balanced manner.

28. In a cotton picking machine, the combination of a picker, a pivoted arm, a pulley-support mounted on said arm and movable along said arm, a pulley, a cord or the like connected to the picker and running over the pulley, said picker being supported by the cord.

29. The combination of a picker, a picker-suspending cord, a cord-suspending pulley co-acting with the cord, and a picker handle.

30. The combination of a picker, a picker-suspending cord, a cord-suspending pulley co-acting with the cord, and means for movably suspending the pulley.

31. The combination of a picker, a picker-suspending cord, a cord-suspending pulley coacting with the cord, and a pivoted arm to support the pulley.

32. The combination of a picker, a picker-suspending cord, a cord-suspending pulley co-acting with the cord, a pivoted arm to support the pulley, and a spring in the connection between the arm and picker.

33. The combination of the picker, a sack connected to the picker, means for suspending the sack and picker, and a cotton receptacle, said sack having a slitted side for discharge of cotton into the receptacle.

34. The combination of the picker, a sack connected to the picker, means for suspending the sack and picker, a cotton receptacle, said sack having a slitted side for discharge of cotton into the receptacle, a vehicle, and means to load the vehicle from the receptacle.

35. In combination, a picker frame, a handle for manipulating the frame, an individual picker spindle, a brush, means for producing a blast lengthwise the brush, and a valve carried by the frame to shut off the blast at will.

36. In combination, a picker frame, an individual picker spindle, a brush, means for producing a blast lengthwise the brush, a valve carried by the frame to shut off the blast at will, a sack, said frame having a conduit opening into the sack, said valve controlling the opening to the conduit.

37. In a cotton picker, the combination of a vehicle, a brush support, a cotton picking brush, a handle for manipulating the support, and an air blast tube carried by said support and movable with it by the handle and having a discharge opening adjacent the brush to direct air lengthwise the same.

38. The combination of a picker brush, a tube having a discharge opening adjacent the brush to direct air lengthwise the same, a steam engine, and an exhaust conduit of the engine communicating with said tube.

39. In a cotton picking machine, a vehicle to run between rows of bushes, a picker, a single picker spindle, brushes pivotally supported in the spindle and operative to pick cotton on either the right or left hand side of the upper part of the spindle, a handle for directing said picker, a swinging picker support pivotally connected to the vehicle to carry the picker over a plurality of rows, a picker-spindle-driving-shaft mediately carried by said support, and means to rotate the shaft.

In testimony whereof, I have signed this specification in the presence of two subscribing witnesses.

GILBERT F. GREENE.

Witnesses:
CHAS. M. CATLIN,
BENJ. R. CATLIN.